(12) United States Patent
Graun et al.

(10) Patent No.: US 11,036,856 B2
(45) Date of Patent: Jun. 15, 2021

(54) NATIVELY MOUNTING STORAGE FOR INSPECTION AND SANDBOXING IN THE CLOUD

(71) Applicant: Fortinet, Inc., Sunnyvale, CA (US)

(72) Inventors: Jason Graun, Mesa, AZ (US); Jesse Alverson, Arvada, CO (US)

(73) Assignee: Fortinet, Inc., Sunnyvale, CA (US)

( * ) Notice: Subject to any disclaimer, the term of this patent is extended or adjusted under 35 U.S.C. 154(b) by 216 days.

(21) Appl. No.: 16/132,433

(22) Filed: Sep. 16, 2018

(65) Prior Publication Data

US 2020/0089881 A1  Mar. 19, 2020

(51) Int. Cl.
| | |
|---|---|
| *H04L 29/06* | (2006.01) |
| *G06F 21/56* | (2013.01) |
| *G06F 21/53* | (2013.01) |
| *H04L 29/08* | (2006.01) |

(52) U.S. Cl.
CPC ............ *G06F 21/565* (2013.01); *G06F 21/53* (2013.01); *G06F 21/566* (2013.01); *H04L 63/1416* (2013.01); *H04L 63/1425* (2013.01); *H04L 63/1433* (2013.01); *H04L 63/20* (2013.01); *G06F 2221/2149* (2013.01); *H04L 67/06* (2013.01); *H04L 67/1097* (2013.01)

(58) Field of Classification Search
CPC ...... G06F 21/565; G06F 21/53; G06F 21/566; G06F 2221/2149; H04L 63/1416; H04L 63/1425; H04L 63/1433; H04L 63/20; H04L 67/06; H04L 67/1097; H04L 63/1408; H04L 67/26
See application file for complete search history.

(56) References Cited

U.S. PATENT DOCUMENTS

| | | |
|---|---|---|
| 6,714,968 B1 | 3/2004 | Prust |
| 6,735,623 B1 | 5/2004 | Prust |
| 7,630,379 B2 | 12/2009 | Morishita |
| 7,743,260 B2 | 6/2010 | Fetik |

(Continued)

FOREIGN PATENT DOCUMENTS

| | | |
|---|---|---|
| EP | 2703992 | 5/2014 |
| WO | 2017210065 | 12/2017 |

OTHER PUBLICATIONS

U.S. Appl. No. 15/985,892, filed May 22, 2018. (34 pgs).
Non-Final Office Action for U.S. Appl. No. 15/985,892, dated Mar. 9, 2020, 36 pages.

*Primary Examiner* — Sarah Su
(74) *Attorney, Agent, or Firm* — Law Office of Dorian Cartwright; Dorian Cartwright

(57) ABSTRACT

Systems and methods for continuously scanning and/or sandboxing files to protect users from accessing infected files by natively mounting public cloud file stores are provided. According to one embodiment, a determination is made by a network security device that is protecting the enterprise network regarding whether an untrusted file stored within a first repository of a public cloud file store, which is natively mounted on the network security device, is a clean file that is free of malicious content by applying one or more security checks to the untrusted file. When a result of the determination is affirmative, the network security device makes the clean file accessible to the users by copying the clean file from the first repository to a second repository that is accessible to the users.

28 Claims, 7 Drawing Sheets

(56) References Cited

U.S. PATENT DOCUMENTS

| | | | |
|---|---|---|---|
| 8,042,185 B1 | 10/2011 | Mu | |
| 8,510,838 B1 | 8/2013 | Sun | |
| 8,549,640 B2 | 10/2013 | Lyle | |
| 8,756,337 B1 | 6/2014 | Canion | |
| 9,070,151 B2 | 6/2015 | Moskowitz | |
| 9,189,265 B2 | 11/2015 | Hiltgen | |
| 9,245,108 B1 | 1/2016 | Khajuria | |
| 9,594,904 B1 | 3/2017 | Jain | |
| 9,594,906 B1 | 3/2017 | Langton | |
| 9,729,572 B1 | 8/2017 | Adams | |
| 9,740,862 B1 | 8/2017 | Quinlan | |
| 9,922,191 B1 | 3/2018 | Grafi | |
| 10,009,370 B1 | 6/2018 | Douglas | |
| 10,230,749 B1 | 3/2019 | Rostami-Hesarsorkh | |
| 10,242,185 B1 | 3/2019 | Goradia | |
| 10,341,355 B1 | 7/2019 | Niemoller | |
| 10,346,260 B1 | 7/2019 | Natanzon | |
| 10,372,909 B2 | 8/2019 | Wray | |
| 10,402,241 B1* | 9/2019 | Loukissas | H04L 67/2804 |
| 10,452,279 B1 | 10/2019 | Malwankar | |
| 10,469,512 B1 | 11/2019 | Ismael | |
| 10,474,640 B1* | 11/2019 | Roche, Jr. | G06F 16/148 |
| 10,482,250 B1 | 11/2019 | Joshi | |
| 10,489,583 B2 | 11/2019 | Wang | |
| 10,503,904 B1 | 12/2019 | Singh | |
| 10,534,909 B2* | 1/2020 | Chalmandrier-Perna | G06F 9/45558 |
| 10,554,688 B1 | 2/2020 | Wueest | |
| 10,567,432 B2 | 2/2020 | Dixon | |
| 2002/0019922 A1 | 12/2002 | Reuter | |
| 2003/0110391 A1 | 6/2003 | Wolff | |
| 2005/0021606 A1 | 1/2005 | Davies | |
| 2005/0235132 A1 | 10/2005 | Karr | |
| 2006/0075199 A1 | 4/2006 | Kallahalla | |
| 2006/0075252 A1 | 4/2006 | Kallahalla | |
| 2006/0101130 A1 | 5/2006 | Adams | |
| 2008/0021902 A1 | 1/2008 | Dawkins | |
| 2009/0144388 A1 | 6/2009 | Gross | |
| 2009/0150511 A1 | 6/2009 | Gross | |
| 2009/0307166 A1 | 12/2009 | Routray | |
| 2010/0005531 A1 | 1/2010 | Largman | |
| 2010/0043072 A1 | 2/2010 | Rothwell | |
| 2010/0070631 A1 | 3/2010 | Cherian | |
| 2010/0161536 A1 | 6/2010 | Clark | |
| 2010/0169972 A1 | 7/2010 | Kuo | |
| 2011/0082997 A1 | 4/2011 | Yochai | |
| 2011/0173698 A1 | 7/2011 | Polyakov | |
| 2012/0066450 A1 | 3/2012 | Yochai | |
| 2013/0074185 A1 | 3/2013 | McDougal | |
| 2013/0333042 A1 | 12/2013 | Saika | |
| 2014/0007239 A1* | 1/2014 | Sharpe | G06F 16/137 726/24 |
| 2014/0025941 A1 | 1/2014 | Bulusu | |
| 2014/0208426 A1 | 7/2014 | Natarajan | |
| 2014/0223096 A1 | 8/2014 | Zhe Yang | |
| 2014/0229688 A1 | 8/2014 | Toyama | |
| 2014/0237590 A1 | 8/2014 | Shua | |
| 2015/0074810 A1* | 3/2015 | Saher | G06F 16/951 726/23 |
| 2015/0101021 A1* | 4/2015 | McErlean | G06F 8/61 726/4 |
| 2015/0150142 A1 | 5/2015 | Austin | |
| 2015/0172301 A1 | 6/2015 | Kumar | |
| 2015/0172305 A1 | 6/2015 | Dixon | |
| 2015/0172311 A1 | 6/2015 | Freedman | |
| 2015/0278520 A1 | 10/2015 | Mraz | |
| 2015/0319182 A1 | 11/2015 | Natarajan | |
| 2015/0331635 A1 | 11/2015 | Ben-Shaul | |
| 2016/0006754 A1 | 1/2016 | Woodward | |
| 2016/0080399 A1 | 3/2016 | Harris | |
| 2016/0092682 A1 | 3/2016 | Adams | |
| 2016/0092684 A1 | 3/2016 | Langton | |
| 2016/0099951 A1 | 4/2016 | Kashyap | |
| 2016/0180090 A1 | 6/2016 | Dalcher | |
| 2016/0203336 A1 | 7/2016 | Nambiar | |
| 2016/0248590 A1 | 8/2016 | Benson | |
| 2016/0292419 A1 | 10/2016 | Langton | |
| 2016/0294851 A1 | 10/2016 | Langton | |
| 2016/0330226 A1 | 11/2016 | Chen | |
| 2016/0381024 A1 | 12/2016 | Zhang | |
| 2017/0041296 A1 | 2/2017 | Ford | |
| 2017/0090821 A1 | 3/2017 | Woodward | |
| 2017/0090929 A1 | 3/2017 | Muttik | |
| 2017/0091461 A1 | 3/2017 | Tin | |
| 2017/0093890 A1 | 3/2017 | Natanzon | |
| 2017/0109045 A1 | 4/2017 | Crawford | |
| 2017/0147817 A1 | 5/2017 | Yamane | |
| 2017/0169214 A1 | 6/2017 | Vejmelka | |
| 2017/0199694 A1 | 7/2017 | Khemani | |
| 2017/0206353 A1 | 7/2017 | Jai | |
| 2017/0250996 A1 | 8/2017 | Rostamabadi | |
| 2017/0251002 A1 | 8/2017 | Rostamabadi | |
| 2017/0251003 A1 | 8/2017 | Rostami-Hesarsorkh | |
| 2017/0264619 A1* | 9/2017 | Narayanaswamy | G06F 21/6209 |
| 2017/0302458 A1 | 10/2017 | Berger | |
| 2017/0337372 A1 | 11/2017 | Zhang | |
| 2017/0353496 A1* | 12/2017 | Pai | H04L 63/1441 |
| 2017/0366606 A1 | 12/2017 | Ben-Shaul | |
| 2018/0018459 A1 | 1/2018 | Zhang | |
| 2018/0027074 A1 | 1/2018 | Collet | |
| 2018/0046799 A1 | 2/2018 | Kohavi | |
| 2018/0096148 A1 | 4/2018 | Setjtko | |
| 2018/0107417 A1 | 4/2018 | Shechter | |
| 2018/0157444 A1 | 6/2018 | Franciosi | |
| 2018/0183681 A1 | 6/2018 | Chen | |
| 2018/0183824 A1 | 6/2018 | Chen | |
| 2018/0159896 A1 | 7/2018 | Soman | |
| 2018/0191739 A1 | 7/2018 | Kraft | |
| 2018/0203641 A1 | 7/2018 | Petrocelli | |
| 2018/0218155 A1* | 8/2018 | Grafi | G06F 21/554 |
| 2018/0268143 A1 | 9/2018 | Grafi | |
| 2018/0336158 A1 | 11/2018 | Iyer | |
| 2018/0336346 A1 | 11/2018 | Guenther | |
| 2018/0359272 A1* | 12/2018 | Mizrachi | G06F 21/57 |
| 2019/0007436 A1 | 1/2019 | Dods | |
| 2019/0034622 A1 | 1/2019 | Kennedy | |
| 2019/0042781 A1 | 2/2019 | Lukacs | |
| 2019/0081983 A1 | 3/2019 | Teal | |
| 2019/0097970 A1 | 3/2019 | Coleman | |
| 2019/0199739 A1 | 6/2019 | Anderson | |
| 2019/0199740 A1 | 6/2019 | Zhang | |
| 2019/0205530 A1 | 7/2019 | Brown | |
| 2019/0205533 A1 | 7/2019 | Diehl | |
| 2019/0228153 A1 | 7/2019 | Scaife | |
| 2019/0228154 A1* | 7/2019 | Agrawal | G06F 21/56 |
| 2019/0235755 A1 | 8/2019 | Abe | |
| 2019/0235973 A1 | 8/2019 | Brewer | |
| 2019/0236273 A1 | 8/2019 | Saxe | |
| 2019/0278922 A1 | 9/2019 | Levin | |
| 2019/0303573 A1 | 10/2019 | Chelarescu | |
| 2019/0319987 A1 | 10/2019 | Levy | |
| 2019/0325059 A1* | 10/2019 | Fair | G06F 9/547 |
| 2019/0332770 A1 | 10/2019 | Kumar | |
| 2019/0340359 A1 | 11/2019 | Kumar | |
| 2019/0347338 A1* | 11/2019 | Mani | G06F 16/134 |
| 2019/0347415 A1 | 11/2019 | Yavo | |
| 2019/0362075 A1 | 11/2019 | Kriz | |
| 2019/0386980 A1* | 12/2019 | Kludy | H04L 63/0838 |
| 2020/0012803 A1* | 1/2020 | Mannan | G06F 21/31 |
| 2020/0050686 A1* | 2/2020 | Kamalapuram | G06F 16/122 |
| 2020/0201918 A1* | 6/2020 | Karande | G06F 16/955 |
| 2020/0218832 A1* | 7/2020 | Pratt | H04L 63/1425 |

\* cited by examiner

NATIVELY MOUNTING STORAGE FOR INSPECTION AND SANDBOXING IN THE CLOUD

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever. Copyright © 2018, Fortinet, Inc.

BACKGROUND

Field

Embodiments of the present invention generally relate to network security. In particular, embodiments of the present invention relate to continuously scanning and/or sandboxing files residing on cloud storage to protect users from accessing infected files by natively mounting public cloud file stores.

Description of the Related Art

Network security consists of policies and practices that are adopted to prevent and monitor unauthorized access, misuse, modification, or denial of a computer network or network-accessible resources. Network security also involves authorization of access to data in a network that is controlled by a network administrator. Computing devices that form part of a computer network, such as an enterprise network, are continually threatened by a risk of attack from various types of malicious content, including, but not limited to, viruses, malware, worms, and Trojans, while accessing data that has been transferred to internal locations from an external source and/or data that has been transferred between different departments, having different levels of trust, by various ways such as through servers, physical storage devices, among other communication channels. One exemplary source of malware infection includes data that is externally uploaded or is provided from untrusted, semi trusted servers or from public cloud file stores that various users then have access to. Another source is the user himself/herself transmitting malware infected data to other users.

Although there are many virus scanning and content filtering systems that purport to protect users from malicious content, including anti-virus (AV) scanners on file systems or applications using the Internet Content Adaptation Protocol (ICAP) for file checking, such systems are reactive in nature. So, while these systems are capable of verifying data and may have the ability to take action to remove bad files once they are discovered, damage may already have been done. When an infected file is discovered by existing AV scanners and file checking systems, the threat is either reported afterwards (i.e., after access to such infected file has already been made available to one or more users) or the threat is reported during execution of such infected file, thereby risking exposure of the network and/or the computing devices in the network between the time the file is introduced until the file is finally inspected.

Meanwhile, as more organizations move towards public/hybrid cloud solutions for file storage, among other things, the need to ensure files do not contain malware becomes critically important. Currently, scanning of a file residing on cloud storage requires passing the file through a security inspection virtual machine (VM)/image. This method is inefficient. Today, there are no security solutions that can scan native cloud object storage. In order to accomplish the task of scanning cloud storage, at present, one must perform one of the following: (A) duplicate the transfer through a device which can proxy the connection over the network to collect a file sample; (B) attach cloud storage to a cloud VM then leverage a sandbox connector to send files to the sandbox; or (C) attach the cloud storage to a cloud VM and run a local static AV scan. All three options are overly complex and resource intensive, which impacts monthly recurring costs. Options A and B are also limited by size restrictions and require additional cloud infrastructure to support either method. Option C provides no protection from zero day or unknown variants due to non-execution static scanning.

Furthermore, the design, implementation, and deployment of virtual machines have also opened up novel threats and security issues, which take on new forms in relation to it. For example, reverse engineering becomes easier due to introspection capabilities, as encryption keys, security algorithms, low-level protection, intrusion detection, or anti-debugging measures can become more easily compromised. Configuration problems, such as creating secure default configurations for virtual machines, are also magnified and if a machine build starts out with poor default configurations, those vulnerabilities may extend to each instance of the virtual machine that is replicated from that build. Finally, technologies associated with virtual machines such as virtual routing and networking can create challenging issues for security, intrusion control, and associated processes.

Therefore, there exists a need for a new paradigm according to which newly introduced files, for instance, through public cloud file stores are physically segregated until they are properly scanned, thereby ensuring only known good files are made available for access to users.

SUMMARY

Systems and methods are described for continuously scanning and/or sandboxing files to protect users from accessing infected files by natively mounting public cloud file stores. Users of an enterprise network are prevented from accessing malware infected files that stored within public cloud file stores. According to one embodiment, a determination is made by a network security device that is protecting the enterprise network regarding whether an untrusted file stored within a first repository of a public cloud file store, which is natively mounted on the network security device, is a clean file that is free of malicious content by applying one or more security checks to the untrusted file. When a result of the determination is affirmative, the network security device makes the clean file accessible to the users by copying the clean file from the first repository to a second repository that is accessible to the users.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1A:
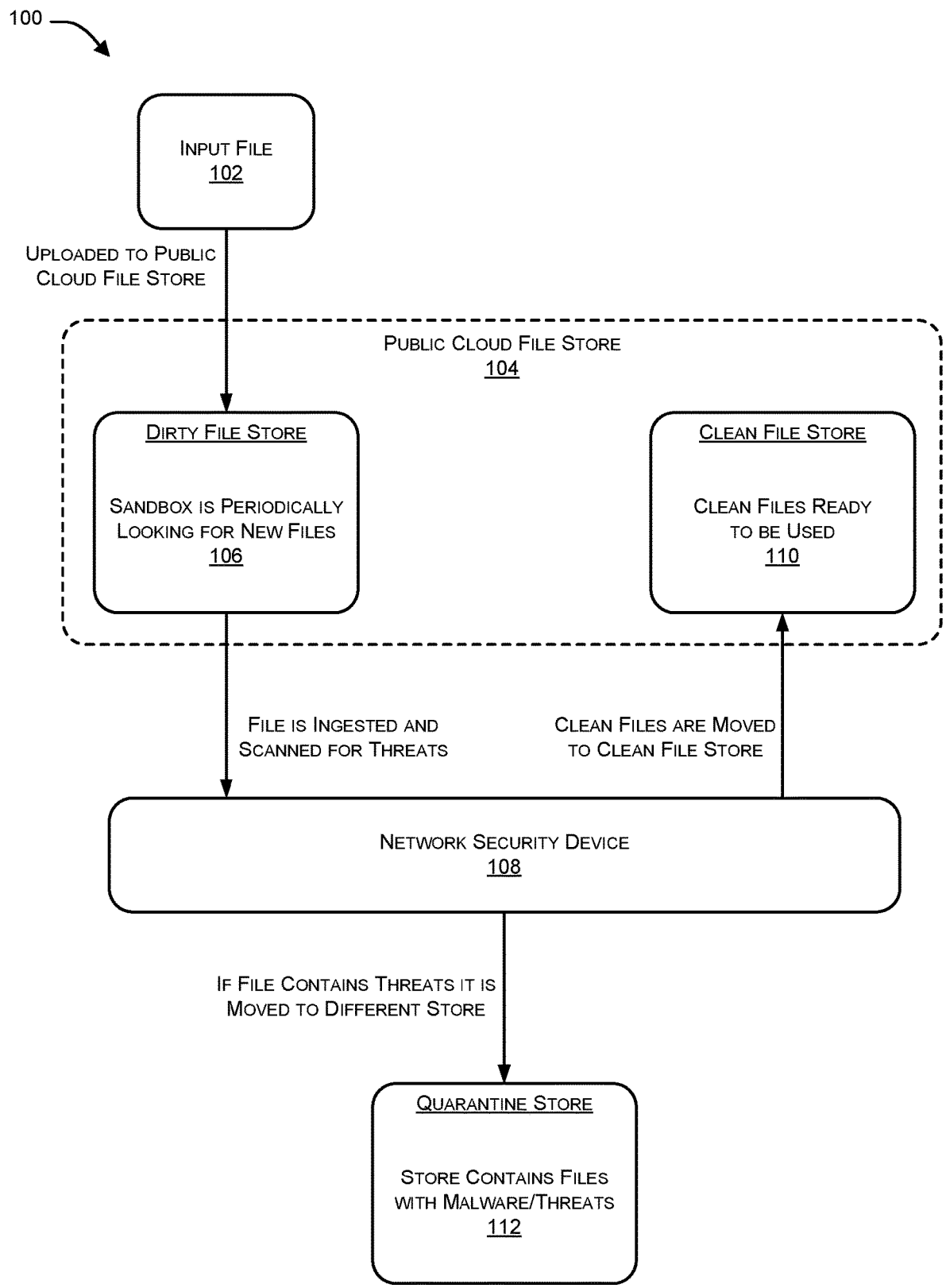
FIGS. 1A-B illustrate exemplary network architectures in which or with which embodiments of the present invention can be implemented.

Systems and methods are described for continuously scanning and/or sandboxing files to protect users from accessing infected files by natively mounting public cloud file stores. According to one embodiment, files that are newly introduced to a public cloud file store that is natively mounted on a network security device protecting an enterprise network, are first subjected to desired security checks (e.g., AV scanning, file checking, sandboxing, etc.) while residing in a segregated data storage area before they are made available for access to users by copying only those files passing the security checks to a sanitized storage area, which may or may not be a part of the public cloud file store, but is accessible to the users. In this manner, the typical model, involving the removal of bad files upon their identification, is turned on its head by initially storing untrusted files in a separate data location of a public cloud file store that is inaccessible to end users and then after the untrusted files have been verified as being free of malware (clean) by a secure data transfer system, the verified clean files are transferred to a data location that is accessible to end users.

In the following description, numerous specific details are set forth in order to provide a thorough understanding of embodiments of the present invention. It will be apparent to one skilled in the art that embodiments of the present invention may be practiced without some of these specific details.

Embodiments of the present invention include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, and firmware and/or by human operators.

Embodiments of the present invention may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present invention with appropriate standard computer hardware to execute the code contained therein. An apparatus for practicing various embodiments of the present invention may involve one or more computers (or one or more processors within a single computer) and storage systems containing or having network access to computer program(s) coded in accordance with various methods described herein, and the method steps of the invention could be accomplished by modules, routines, subroutines, or subparts of a computer program product.

If the specification states a component or feature "may", "can", "could", or "might" be included or have a characteristic, that particular component or feature is not required to be included or have the characteristic.

The phrase "network appliance" generally refers to a specialized or dedicated device for use on a network in virtual or physical form. Some network appliances are implemented as general-purpose computers with appropriate software configured for the particular functions to be provided by the network appliance; others include custom hardware (e.g., one or more custom Application Specific Integrated Circuits (ASICs)). Examples of functionality that may be provided by a network appliance include, but are not limited to, simple packet forwarding, layer 2/3 routing, content inspection, content filtering, firewall, traffic shaping, application control, Voice over Internet Protocol (VoIP) support, Virtual Private Networking (VPN), IP security (IPSec), Secure Sockets Layer (SSL), antivirus, intrusion detection, intrusion prevention, Web content filtering, spyware prevention and anti-spam. Examples of network appliances include, but are not limited to, network gateways and network security appliances (e.g., FORTIGATE family of network security appliances and FORTICARRIER family of consolidated security appliances), messaging security appliances (e.g., FORTIMAIL family of messaging security appliances), database security and/or compliance appliances (e.g., FORTIDB database security and compliance appliance), web application firewall appliances (e.g., FORTIWEB family of web application firewall appliances), application acceleration appliances, server load balancing appliances (e.g., FORTIBALANCER family of application delivery controllers), vulnerability management appliances (e.g., FORTISCAN family of vulnerability management appliances), configuration, provisioning, update and/or management appliances (e.g., FORTIMANAGER family of management appliances), logging, analyzing and/or reporting appliances (e.g., FORTIANALYZER family of network security reporting appliances), bypass appliances (e.g., FORTIBRIDGE family of bypass appliances), Domain Name Server (DNS) appliances (e.g., FORTIDNS family of DNS appliances), wireless security appliances (e.g., FORTIWIFI family of wireless security gateways), virtual or physical sandboxing appliances (e.g., FORTISANDBOX family of security appliances) FORIDDOS, wireless access point appliances (e.g., FORTIAP wireless access points), switches (e.g., FORTISWITCH family of switches) and IP-PBX phone system appliances (e.g., FORTIVOICE family of IP-PBX phone systems).

The phrases "security device" or "network security device" generally refers to a hardware device or network appliance that provides security services to a private network, for example, providing one or more of data privacy, protection, encryption and security. A network security device can be a device providing one or more of the following features: network firewalling, VPN, antivirus, intrusion prevention (IPS), content filtering, data leak prevention, antispam, antispyware, logging, reputation-based protections, event correlation, network access control, vulnerability management, load balancing and traffic shaping— that can be deployed individually as a point solution or in various combinations as a unified threat management (UTM) solution. Non-limiting examples of network security devices include proxy servers, firewalls, sandboxing appliances, Intrusion Prevention Systems OP S s), Intrusion Detection Systems (IDSs), VPN appliances, gateways, UTM appliances and the like.

Systems and methods are described for preventing users of an enterprise network from accessing malware infected files that are stored within public cloud file stores by continuously scanning and/or sandboxing files by natively mounting a public cloud file store as a file system, for example, within a network security device. Open source software is available for mounting an Amazon Web Services (AWS) Simple Storage Service (S3) bucket at http://s3tools.org/download and https://github.com/s3fs-fuse/s3fs-fuse.

In an exemplary aspect, the present disclosure provides a secure data transfer system that includes: a non-transitory storage device having embodied therein one or more routines operable to prevent users (also interchangeably referred to as "end users") of an enterprise network from accessing malware infected files that are stored within public cloud file stores; and one or more processors coupled to the non-transitory storage device and operable to execute the one or more routines, wherein the one or more routines include: an untrusted file processing module, which when executed by the one or more processors: accesses an untrusted file stored within a first repository of a public cloud file store, said public cloud file store being natively mounted on a network security device that is protecting the enterprise network, wherein the users do not have read access to the first repository of the public cloud file store; and causes the network security device to make a determination regarding whether the untrusted file is a clean file that is free of malicious content by applying one or more security checks to the untrusted file; and a clean file transfer module, which when executed by the one or more processors, makes the clean file accessible to the users by, when a result of the determination is affirmative, copying the clean file from the first repository to a second repository that is accessible to the users.

In an embodiment, the network security device can include any or a combination of a sandbox device, a network controller, a firewall, a network gateway device, an Intrusion Prevention System (IPS), and an Intrusion Detection System (IDS).

In an embodiment, the network security device can include a sandbox appliance, and wherein the one or more security checks comprise behavioral-based malware detection by deploying a file inside a virtual environment and analyzing its behavior.

In an embodiment, the network security device can include a virtual machine (VM) that is controlled by a sandbox engine to determine whether the untrusted file is a clean file that is free of malicious content.

In an embodiment, the network security device can copy the file to the second repository by sharing it by means of any or a combination of network file system (NFS) file transfer protocol (FTP), common Internet file system (CIFS), Internet Small Computer Systems Interface (i SC SI), Storage Area Network (SAN), and local storage.

In an embodiment, the untrusted file processing module can further remove any malware from the untrusted file that is detected by the one or more security checks when the result of said determining is negative.

In an embodiment, the untrusted file processing module can quarantine or delete the untrusted file when the result of the determination is negative.

In an embodiment, the second repository can be part of the network security device or part of an external storage device that forms part of the enterprise network.

In an embodiment, the second repository can form part of the public cloud file store.

In an embodiment, the public cloud file store can be provided by a third-party cloud storage service provider, for example, the public cloud file store can be any or a combination of Amazon Simple Storage Service (Amazon S3)™, Microsoft Azure™, Google Cloud Platform™, and IBM Cloud™.

In an embodiment, the network security device can determine whether the untrusted file is a clean file that is free of malicious content based any or a combination of sandboxing analysis (e.g., behavioral-based malware detection), file signature, file hash, file path, file attributes, file source, file pre-scan parameters, file extension, file content, and file name, and any part thereof.

In an embodiment, the network security device can make the determination regarding whether the untrusted file is a clean file that is free of malicious content by first moving the untrusted file from the first repository to a third repository, and then applying one or more security checks to the untrusted file in the third repository, and moving back the checked file as a clean file into the first repository for onward copying to the second repository or moving the checked file as a clean file directly from the third repository to the second repository.

Another aspect of the present disclosure relates to a method that can include: receiving, by a network security device that is protecting an enterprise network, a notification, via an Application Programming Interface (API) call from a notification service of a public cloud file store, regarding existence of an untrusted file stored within a first repository of the public cloud file store, said public cloud file store being natively mounted on the network security device, wherein users of the enterprise network do not have read access the first repository of the public cloud file store; determining, by the network security device, whether the untrusted file is a clean file that is free of malicious content by applying one or more security checks to the untrusted file; and making the clean file accessible to the users by, when a result of said determining is affirmative, copying the clean file from the first repository to a second repository that is accessible to the users.

Although the present disclosure has been described with the purpose of enabling users to access only clean/scanned/sanitized files, it should be appreciated that the same has been done merely to illustrate the invention in an exemplary manner and any other purpose or function for which the explained structure or configuration can be used, is covered within the scope of the present disclosure.

Exemplary embodiments will now be described more fully hereinafter with reference to the accompanying drawings, in which exemplary embodiments are shown. This invention may, however, be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named.

Figure 1B:
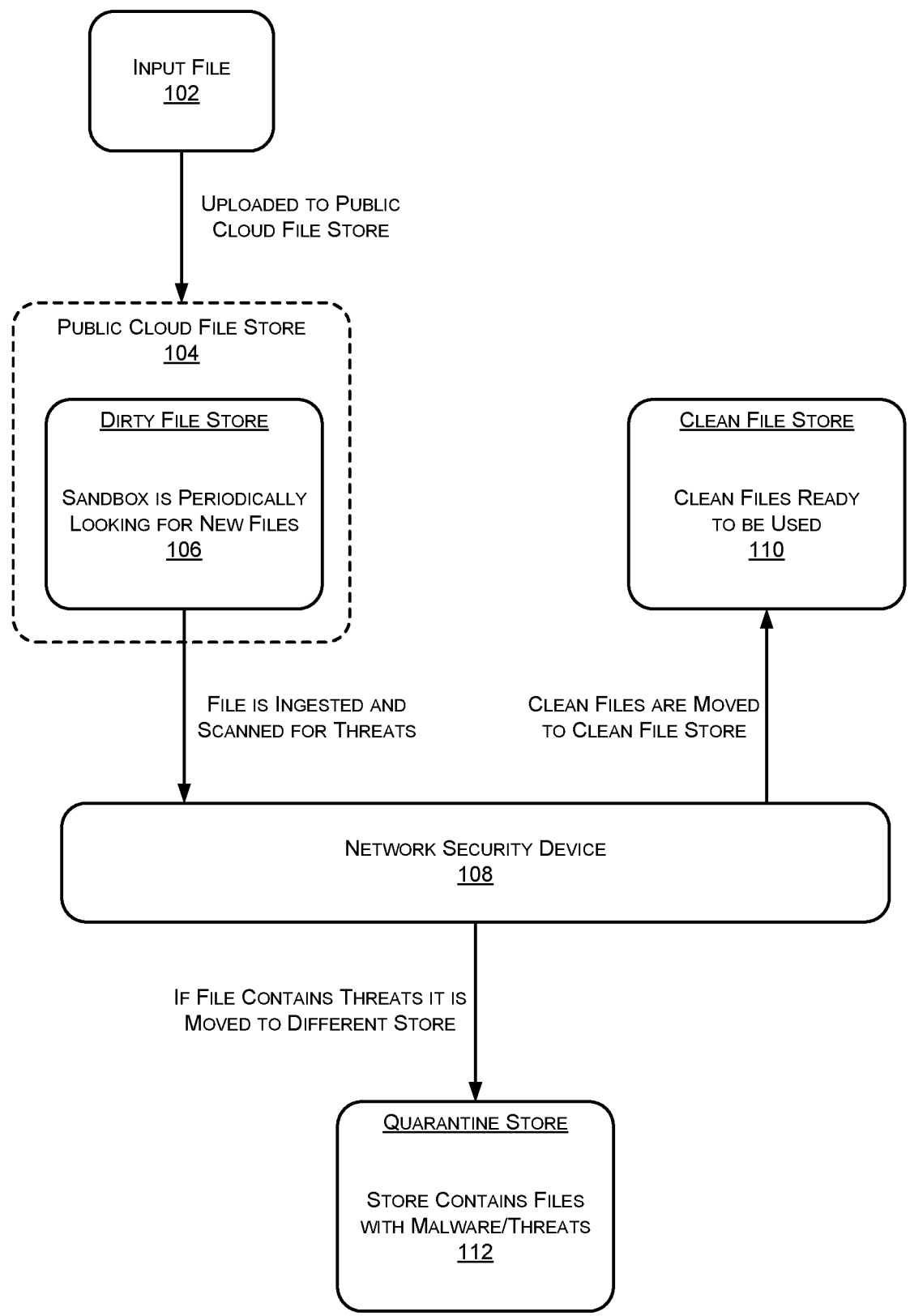

FIGS. 1A-B illustrate exemplary network architectures in which or with which embodiments of the present invention can be implemented.

FIG. 1A illustrates an exemplary network architecture 100 in which a file is received from an external network/web server for use in a network (for instance, an enterprise network) operatively configured with a network security device 108 in accordance with an embodiment of the present invention. Network security device 108 provides a secure data transfer system between an external network and an enterprise network such that users of the enterprise network have access to only clean files that are free from malicious content.

In the context of the present example, an input file 102 (which may be interchangeably referred to herein as an untrusted file initially) can be sent by an external entity to any user of the enterprise network and can be stored within a first repository, e.g. dirty file store 106 of a public cloud file store 104. The public cloud file store 104 can be natively mounted on the network security device 108 that protects the enterprise network. Those skilled in the art will recognize there are many scenarios in which untrusted files can be introduced into an enterprise network. For example, input file 102 might represent an attachment to an electronic mail message (e-mail) addressed to a user. Alternatively, input file 102 may be uploaded from external sources through a webform of a web server of the enterprise. Users of the network are typically free to initiate actions to access external content. As such, using the Internet, a user can visit a website and attempt to download a file from a music site, for instance. Input file 102 might also represent a file obtained by the user from another cloud service. In other exemplary embodiments, input file 102 may be shared with a user in the enterprise network by an external entity or even a department within the same enterprise network may be attempting to share/send a file to another department. Embodiments of the present invention can be employed in any or all of these circumstances as elaborated further below.

In the context of the present example, the network security device 108 can implement a sandbox/inspection engine (not shown), that is operable to perform security scanning on untrusted files, such as input file 102, that are initially shared/sent/uploaded dirty file store 106 of public cloud file store 104, before it is made accessible to its intended user/any user of the enterprise network. In a similar manner, all files being requested by different users of the network can first be stored in dirty file store 106, which can be configured to be inaccessible to the end users. In an example, as soon as input file 102 is stored in dirty file store 106, a notification can be sent via an API call from a notification service (not shown) of public cloud file store 104 to the network security device 108 regarding existence of input file 102 in dirty file store 106. In response to the notification, network security device 108 can perform one or more security checks on input file 102 to determine whether input file 102 is free from malicious content.

When network security device 108 indicates input file 102 is free of malware/malicious content (clean), network security device 108 can transfer file 102 from first repository, i.e., dirty file store 106, to a second repository, e.g., clean file store 110, which is accessible to users of the enterprise network. In an aspect, network security device 108 can include any or a combination of a Unified Threat Management (UTM) appliance, a sandbox appliance, a firewall, a content scanning engine, an anti-virus engine and a gateway device. In another aspect, network security device 108 can be a VM that is controlled by a sandbox appliance. Users can access the files through their respective computing devices that can include, but are not limited to, a tablet computer, a laptop computer, a desktop computer, a smart phone, a wearable device among other like devices.

In one embodiment, network security device 108 is alerted to the existence of new files received within dirty file store 106 and processes the new files as they arrive. In another embodiment, network security device 108 may periodically check for the existence of new files within dirty file store 106 and process the new files in a batch. In one embodiment, the security checks applied by the sandbox/inspection engine of network security device 108 can include behavioral-based malware detection by executing the untrusted file within a sandbox environment to observe whether execution of the untrusted file reveals behavior indicative of the existence of malware.

As noted above, upon determining that the file at issue is clean, that is, free from malware, network security device 108 can make the clean file accessible to the users by copying and/or transferring the clean file from dirty file store 106 to clean file store 110 that is accessible to the users.

In an aspect, clean file store 110 can contain only clean files and such files may be available to various users as per their respective sharing rights etc. granted to them. For example, users of different departments may be limited to accessing cloud file shares associated with their respective departments. At the same time, each user can have access to files created by him/her (whether clean or not) in this manner, making embodiments of the present invention very responsive and helpful in connection with avoidance of zero-day attacks. In this manner, embodiments of the present invention ensure that files that are newly introduced to a network or a defined portion thereof are first subjected to desired security checks while residing in a segregated data storage area before they are made available for access by copying only known good files to a sanitized storage area that is accessible to users.

In an aspect, network security device 108 can remove any malware from the untrusted file that is detected as associated with malicious content such that transfer to clean file store 110 can be made after freeing the file from malicious content. In another aspect, the files associated with malicious content can be quarantined by storing in a quarantine store 112, which cannot be accessed by the users. In yet another aspect, the files associated with malicious content can be deleted.

In another aspect, represented by a simplified architecture as illustrated in FIG. 1B, clean file store 110 may not be a part of public cloud store 104. For instance, the clean file store 110 can be a part of network security device 108 or can be a part of an external storage that forms part of the enterprise network such that users of the enterprise network can seamlessly access clean file store 110. Further, as described above, access to the clean files for different users can be granted on basis of authentication/access rights granted to each user that can be matched as appropriate by permissions associated with any file.

Figure 2:
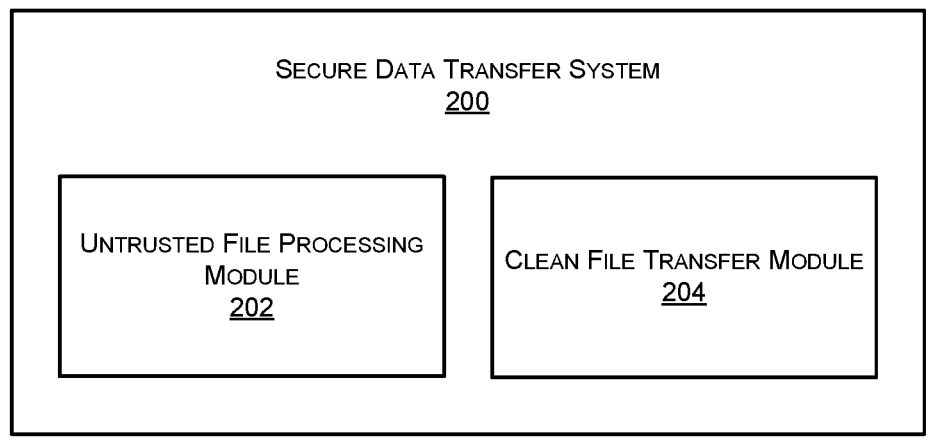
FIG. 2 illustrates an exemplary module diagram for a secure file transfer system in accordance with an embodiment of the present invention.

FIG. 2 illustrates an exemplary module diagram for a secure data transfer system 200 in accordance with an embodiment of the present invention. In an aspect, secure data transfer system 200 is implemented within a network security device, such as network security device 108. In the context of the present example, secure data transfer system 200 includes an untrusted file processing module 202 and a clean file transfer module 204. In an aspect, an untrusted file (on which threat detection and/or scanning is to be performed and eventually copied to second/safe repository) can be received from an external network and can be stored within a first repository within a public cloud file store natively mounted on the network security device implementing secure data transfer system 200. Those skilled in the art will appreciate that the network security device protects an enterprise network as users of the enterprise network do not have read access to the first repository of the public cloud file store. In an embodiment, the public cloud file store can be provided by a third-party cloud storage service provider, for example, the public file store can be any or a combination of Amazon Simple Storage Service (Amazon S3)™, Microsoft Azure™, Google Cloud Platform™, IBM Cloud™, and the like. The untrusted file can be, for instance, can be one that has just been introduced to the network/file share system in which an embodiment of the present invention has been deployed, and is yet to be scanned/analyzed for existence of potential malicious content. When a new file is stored in the first repository, a notification can be sent to untrusted file processing module 202 via an API call from a notification service of the public cloud file store regarding existence of the untrusted file.

In an aspect, responsive to receiving the notification, untrusted file processing module 202 can access the untrusted file to determine whether the untrusted file is a clean file that is free of malware by applying one or more security checks to the untrusted file. The one or more security checks applied by module 202 can include, but are not limited to, (i) state of the art content scanning, which may be performed using any or a combination of file signature, file hash, file path, file attributes, file source, file pre-scan parameters, file extension, file content, and file name, and any part thereof and/or (ii) behavioral-based malware detection.

In one embodiment, untrusted file processing module 202 can further remove any malware from the untrusted file that is detected by the one or more security checks when the result of the determination of the untrusted file being clean is negative (i.e., when the file demonstrates behavior indicative of the existence of malware or otherwise contains malicious content). In another embodiment, untrusted file processing module 202 can quarantine or delete the untrusted file when the result of the determination is negative, which indicates existence of malicious content. For example, files associated with malicious content can be stored in a quarantine store which cannot be accessed by the users of the enterprise network.

In an aspect, clean file transfer module 204 can make the clean file (confirmed or generated by module 202) accessible to the users by, copying or transferring the clean file from a first repository (e.g., dirty file store 104) that is inaccessible to end users to a second repository (e.g., clean file store 110) that is accessible to end users, when the result of determination of the untrusted file being clean is affirmative. As can be readily understood, a clean file can be an untrusted file that has been found to be free of malware by untrusted file processing module 202 or made free of malware/undesired attributes/behavior.

In another aspect, clean file transfer module 204 can copy the file to the second repository by sharing it by means of any or a combination of network file system (NFS) file transfer protocol (FTP), common Internet file system (CIFS), Internet Small Computer Systems Interface (iSCSI), Storage Area Network (SAN), and local storage. In one embodiment, the second repository can be part of the network security device or secure data transfer system 200. In another embodiment, the second repository can be a part of an external storage device that forms part of the enterprise network. In yet another embodiment, the second repository can form part of the public cloud file store itself that is natively mounted by secure data transfer system 200.

Alternately, in an aspect, untrusted file processing module 202 can make a determination regarding whether the untrusted file is a clean file that is free of malicious content by first moving the untrusted file from the first repository to a third repository, such that the one or more security checks are applied to the untrusted file in the third repository. In one embodiment, the checked file can be moved back as a clean file into the first repository for onward copying to the second repository. In another embodiment, the checked file can be moved as a clean file directly from the third repository to the second repository such that the clean file can be accessed by the users of the enterprise network.

In an aspect, secure data transfer system 200 can be configured as a network security device or be part of one. The network security device can include any or a combination of a sandbox device, a network controller, a firewall, a network gateway device, an Intrusion Prevention System (IPS), and an Intrusion Detection System (IDS). In one embodiment, the network security device can further include a sandbox appliance, such as one of the FORTISANDBOX family of sandbox appliances available from Fortinet, Inc., the assignee of the present invention. FORTISANDBOX is a trademark or registered trademark of Fortinet, Inc. of Sunnyvale, Calif. In another embodiment, the network security device comprises a VM that is controlled by a sandbox appliance to determine whether the untrusted file is a clean file that is free of malicious content.

In an exemplary embodiment, the first repository and the second repository can be on different storage devices, while in another exemplary embodiment, the first repository and the second repository can be on a common storage device or within a common public cloud file store. The first and second repositories may also be accessed via different file system access protocols. For example, a data store to which a web server stores completed web forms may be mounted by the network security device as NFS and resulting clean files may be copied to file shares accessible to end users via CIFS. Any other potential implementation of how first and second repositories are configured using at least one public cloud file store are well within the scope of the present disclosure.

In yet another aspect, the second repository can be part of the public cloud file store or an external storage operatively coupled with secure data transfer system 200 and can be configured such that the one or more users, based on their authentication and/or access rights, are able to access the second repository.

Those skilled in the art will appreciated that these are only exemplary modules and any other modules or sub-module can be included as part of embodiments of the present invention. These modules can also be merged or divided into super-modules or further sub-modules as appropriate for a particular implementation.

Figure 3:
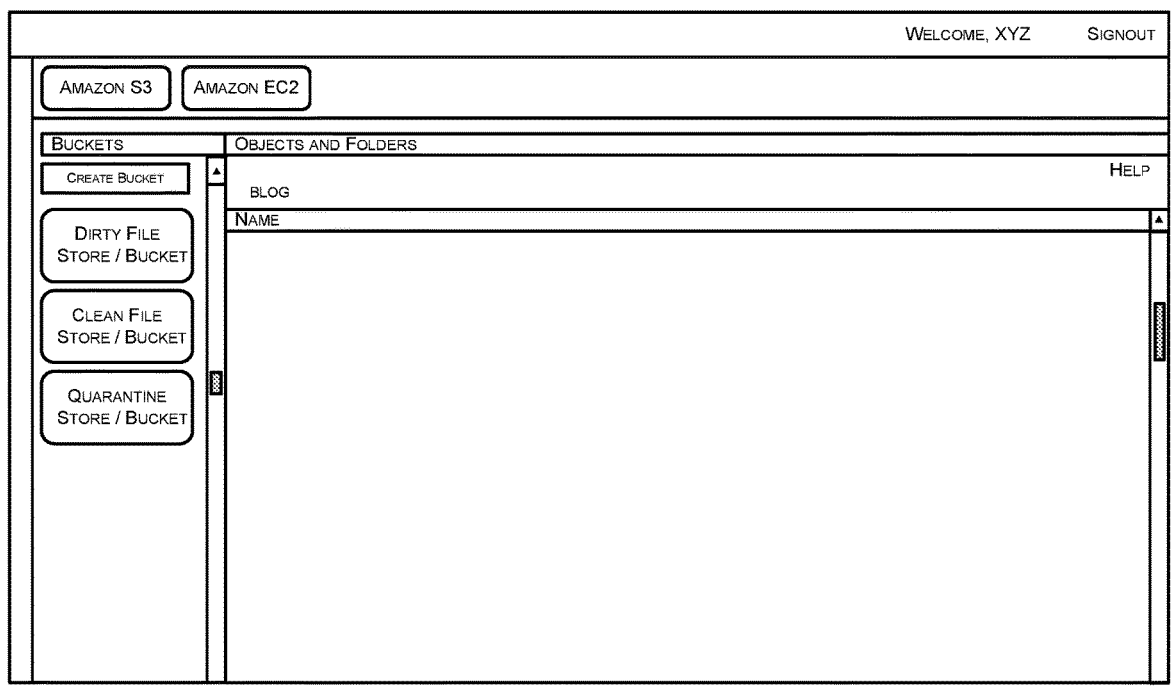
FIG. 3 conceptually illustrates configuration of multiple buckets in a public cloud file store for transfer of clean files from a dirty file store/bucket to a clean file store/bucket in accordance with an embodiment of the present invention.

FIG. 3 conceptually illustrates configuration of multiple buckets in a public cloud file store via a graphical user interface screen 300 for transfer of clean files from dirty file store/bucket to clean file store/bucket in accordance with an embodiment of the present invention.

In context of the present example, FIG. 3 represents configuration of a dirty file store/bucket, a clean file store/bucket and a quarantine store/bucket in a public cloud file store, e.g., Amazon S3. An untrusted file, which has been introduced to the network/secure data transfer system and has yet to be scanned for existence of potential malicious content can be stored in the dirty file store/bucket. The dirty file store/bucket defined within the public cloud file store as well as one or both of the clean file store/bucket and the quarantine store/bucket defined within the public cloud file store can be natively mounted as a file system, for example, within the network security device protecting the enterprise network. When a file is introduced to the dirty file store/bucket, the network security device receives a notification via an API call from a notification service of the public cloud file store regarding existence of an untrusted file stored within the dirty file store/bucket. The users of the enterprise network do not have read access of the dirty file store/bucket.

Responsive to receiving the notification, the network security device can access the untrusted file to determine whether the untrusted file is a clean file that is free of malicious content by applying one or more security checks. The clean file can be made accessible to the users by copying the clean file from the dirty file store/bucket to the clean file store/bucket that can be accessible by the users. Further, when the untrusted file is determined to be associated with malicious content, the untrusted file can be stored in the quarantine store/bucket or can be deleted such that the users cannot access the files associated with malicious content.

Figure 4A:
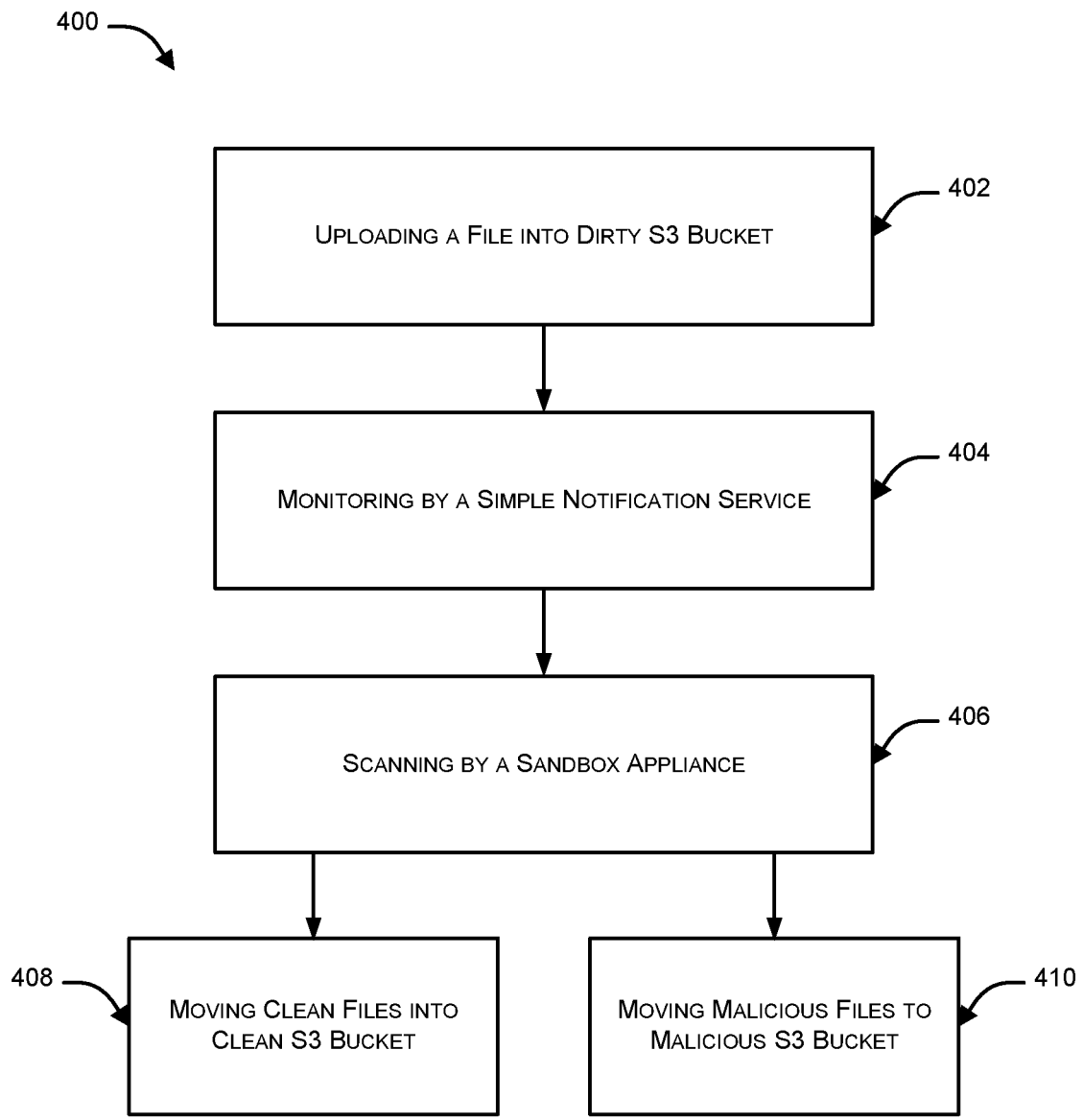
FIGS. 4A-B are flow diagrams illustrating exemplary methods of secure data transfer in accordance with embodiments of the present invention.
Figure 4B:
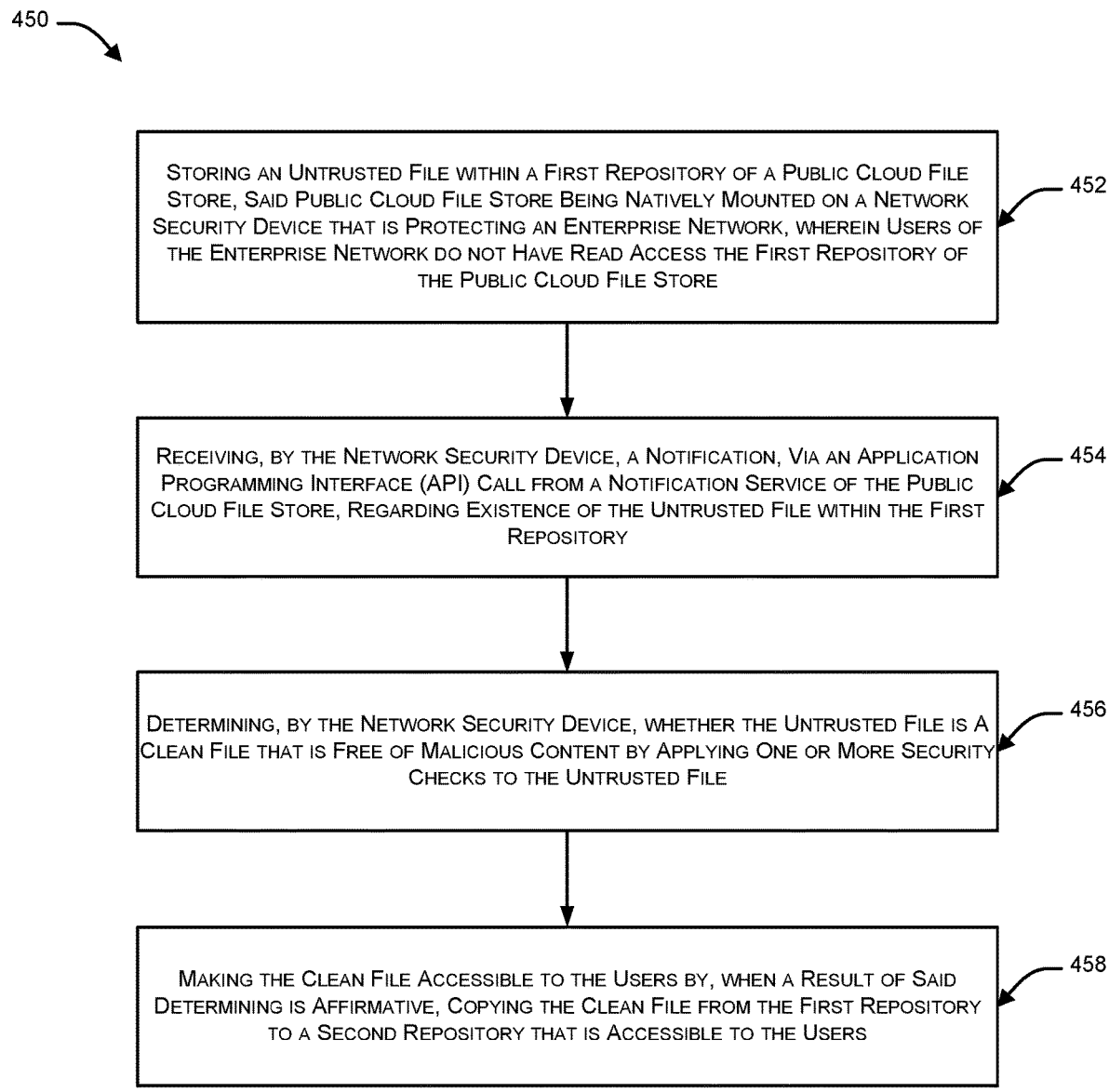

FIGS. 4A-B are flow diagrams illustrating exemplary methods of secure data transfer in accordance with embodiments of the present invention.

FIG. 4A is a flow diagram 400 illustrating processing of a new file in accordance with an embodiment of the present invention. In the context of the present example, natively mounting a public cloud file store such as an S3 bucket by the network security device protecting an enterprise network enables bulk scanning and sandboxing of files stored within a public cloud file store, thereby allowing such files to be continuously checked for malware and zero-day threats. Once a file is determined to be clean, the file can be moved to a clean bucket, whereas any file containing threats can be quarantined into a separate quarantine file store. While in the context of the present example, the various functions/procedures for processing of a new file are described with reference to Amazon Web Services (AWS) simple notification service (SNS) (a fully managed pub/sub messaging service that makes it easy to decouple and scale microservices, distributed systems, and serverless applications) and AWS Lambda (an event-driven computing cloud service available through AWS) and AWS Lambda functions, those skilled in the art will appreciate similar notification services and event-driven computing mechanisms are available in other public cloud storage services.

At block 402, an input file is uploaded into a first repository of a public cloud file store. For example, a file can be uploaded into a dirty S3 bucket by any means, web front end, File Transfer Protocol (FTP), API, and the like.

At block 404, a notification service, such as simple notification service (SNS), can constantly monitor the dirty S3 bucket and can watch for new files within the dirty S3 bucket that are pending a scan by the network security device.

At block 406, to enable scanning by a sandbox appliance/network security device, responsive to detecting the existence of the new file, the SNS service monitoring the dirty S3 bucket calls a lambda function for handling the new file (referred to herein as "new file lambda"). New file lambda then writes information regarding the new file into a database e.g., an Amazon database. The information regarding the new file may include its attributes such as file path, name, hash, along with a field for new file, pre-scan clean, pre-scan unknown, pre-scan malicious, VM detonation required, VM detonation clean, VM detonation Suspicious low/med/high, and VM detonation malicious result, and VM detonation S3 bucket path.

Further, another SNS service monitoring the database can detect the new file information added to the database and then notify another lambda function (referred to herein as "pre-scan lambda"), to initiate sandbox pre-scanning, for example, by calling the sandbox controller API with the file attributes (e.g., filename/filepath) from the database. In one embodiment, the sandbox pre-scanning includes performing a virus scan as there is no need to sandbox a file already flagged as a virus. In an embodiment, pre-scan lambda can check the database to see if the file hash associated with the file at issue has already been scanned such that the end user can configure a stop function if desired to save computing resources of sandboxing.

In context of the present example, the sandbox controller can run the file through a pre-scan engine to perform pre-scanning before detonation in a VM and results may be collected via a pre-scan result lambda function API call and written to the database. The SNS service can then kick off a detonate lambda function to move the file with a pre-scan result other than pre-scan malicious to a VM detonation S3 bucket and can write the detonation path and VM detonation required flag in the database. Conversely, if the pre-scan flags the file as a virus (pre-scan malicious), an AV signature can be written to the database and intelligence sharing regarding the detected virus in real-time, for example, with other network security devices associated with the private network by the sandbox appliance passing information about the detected virus via a cooperative security fabric (e.g., the Fortinet Security Fabric).

Further, after the detonate lambda function has moved the file to a dedicated S3 bucket, the sandbox can be called over the API with instructions to detonate the file in a VM with the new file path within the isolated S3 bucket. The sandbox controller can then instruct the detonation VM(s) of the dedicated/isolated S3 file path along with the credentials to read/write within that isolated bucket.

In one embodiment, lambda can trigger periodically, e.g., every 60 seconds after detonation instruction to poll the sandbox controller API for the result of the detonation until a final result is available to record in the database. After the final result is available and stored in the database, a cleanup lambda function is then launched. Depending on result of the scan, the AV signature can be written and passed to the fabric by the sandbox or a clean result is reported to the fabric by the sandbox.

In context of the present example, at block 408, the cleanup lambda function can move clean files (tagged in the database) from the dirty S3 bucket or the isolated VM detonation S3 bucket to a clean S3 bucket.

At block 410, malicious files (and suspicious files) can be moved to a malicious S3 bucket where they can be preserved for analysis and understanding of the context of attack, for example, or they can be deleted.

FIG. 4B is a flow diagram 450 illustrating a method of secure data transfer in accordance with an embodiment of the present invention.

In context of the present example, the method begins, at block 452, by storing an untrusted file within a first repository of a public cloud file store, which is natively mounted on a network security device that is protecting an enterprise network. The users of the enterprise network do not have read access the first repository of the public cloud file store. At block 454, the network security device receives a notification, via an API call from a notification service monitoring the first repository of the public cloud file store, regarding existence of an untrusted file within the first repository. At block 456, the network security device determines whether the untrusted file is a clean file that is free of malicious content by applying one or more security checks to the untrusted file. At block 458, when a result of determining at block 456 is affirmative, the clean file is made accessible to the users by copying the clean file from the first repository to a second repository that is accessible to the users.

Embodiments of the present disclosure include various steps, which have been described above. A variety of these steps may be performed by hardware components or may be embodied on a computer-readable storage medium in the form of machine-executable instructions, which may be used to cause a general-purpose or special-purpose processor programmed with instructions to perform these steps. Alternatively, the steps may be performed by a combination of hardware, software, and/or firmware.

Figure 5:
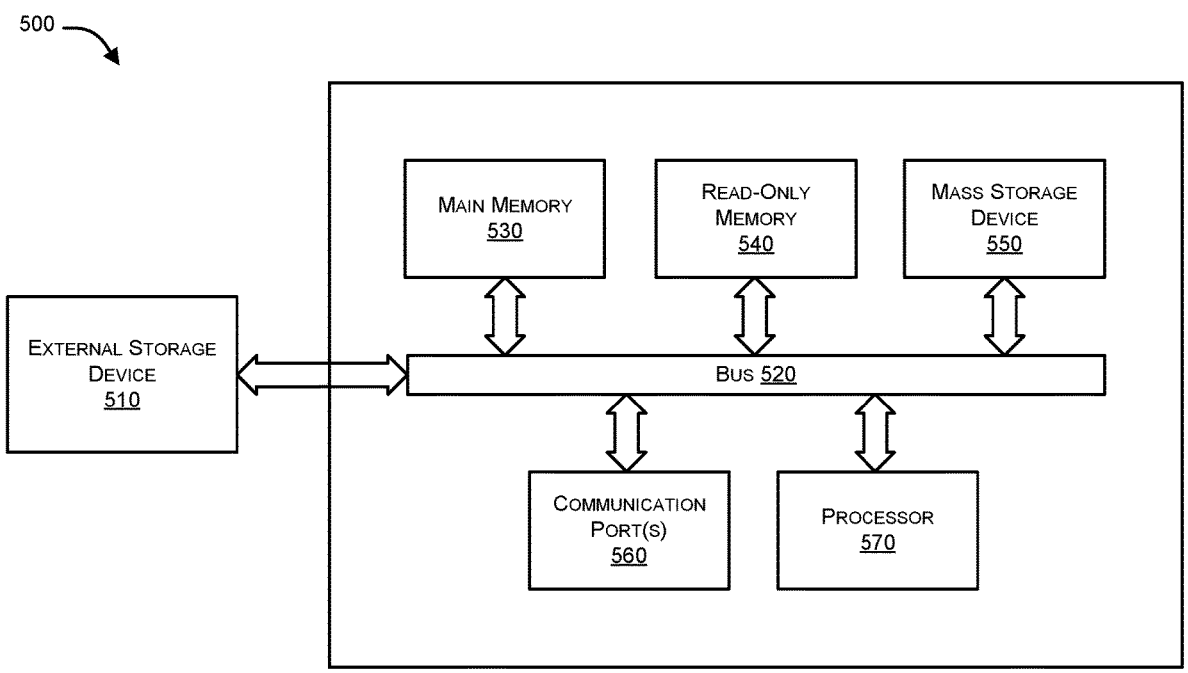
FIG. 5 illustrates an exemplary computer system in which or with which embodiments of the present invention may be utilized.

FIG. 5 illustrates an exemplary computer system 500 in which or with which embodiments of the present invention may be utilized. Computer system 500 may represent a secure file transfer agent (e.g., secure data transfer system 200) or a network security device (e.g., network security device 108).

As shown in the figure, computer system 500 includes an external storage device 510, a bus 520, a main memory 530, a read only memory 540, a mass storage device 550, communication port 560, and a processor 570. A person skilled in the art will appreciate that computer system 500 may include more than one processor and communication ports. Examples of processor 570 include, but are not limited to, an Intel® Itanium® or Itanium 2 processor(s), or AMD® Opteron® or Athlon MP® processor(s), Motorola® lines of processors, FortiSOC™ system on a chip processors or other future processors. Processor 570 may include various modules associated with embodiments of the present invention.

Communication port 560 can be any of an RS-232 port for use with a modem based dialup connection, a 10/100 Ethernet port, a Gigabit or 10 Gigabit port using copper or fiber, a serial port, a parallel port, or other existing or future ports. Communication port 560 may be chosen depending on a network, such a Local Area Network (LAN), Wide Area Network (WAN), or any network to which computer system 500 connects.

Memory 530 can be Random Access Memory (RAM), or any other dynamic storage device commonly known in the art. Read only memory 540 can be any static storage device(s) e.g., but not limited to, a Programmable Read Only Memory (PROM) chips for storing static information e.g., start-up or BIOS instructions for processor 570. SANs and VSANs may also be deployed.

Mass storage 550 may be any current or future mass storage solution, which can be used to store information and/or instructions. Exemplary mass storage solutions include, but are not limited to, Parallel Advanced Technology Attachment (PATA) or Serial Advanced Technology Attachment (SATA) hard disk drives or solid-state drives (internal or external, e.g., having Universal Serial Bus (USB) and/or Firewire interfaces), e.g. those available from Seagate (e.g., the Seagate Barracuda 7200 family) or Hitachi (e.g., the Hitachi store bucket 7K1000), one or more optical discs, Redundant Array of Independent Disks (RAID) storage, e.g. an array of disks (e.g., SATA arrays), available from various vendors including Dot Hill Systems Corp., LaCie, Nexsan Technologies, Inc. and Enhance Technology, Inc. Bus 520 communicatively couples processor(s) 570 with the other memory, storage and communication blocks. Bus 520 can be, e.g. a Peripheral Component Interconnect (PCI)/PCI Extended (PCI-X) bus, Small Computer System Interface (SCSI), USB or the like, for connecting expansion cards, drives and other subsystems as well as other buses, such a front side bus (FSB), which connects processor 570 to software system.

Optionally, operator and administrative interfaces, e.g., a display, keyboard, and a cursor control device, may also be coupled to bus 520 to support direct operator interaction with computer system 500. Other operator and administrative interfaces can be provided through network connections connected through communication port 560.

External storage device 510 can be any kind of external hard-drives, floppy drives, IOMEGA® Zip Drives, Compact Disc—Read Only Memory (CD-ROM), Compact Disc—Re-Writable (CD-RW), Digital Video Disk—Read Only Memory (DVD-ROM). Components described above are meant only to exemplify various possibilities. In no way should the aforementioned exemplary computer system limit the scope of the present disclosure.

While embodiments of the present invention have been illustrated and described, it will be clear that the invention is not limited to these embodiments only. Numerous modifications, changes, variations, substitutions, and equivalents will be apparent to those skilled in the art, without departing from the spirit and scope of the invention, as described in the claims.

What is claimed is:

1. A secure data transfer system comprising:
a non-transitory storage device having embodied therein one or more routines operable to prevent users of an enterprise network from accessing malware infected files that are stored within public cloud file stores; and
one or more processors coupled to the non-transitory storage device and operable to execute the one or more routines, wherein the one or more routines include:
an untrusted file processing module, which when executed by the one or more processors:
accesses an untrusted file stored within a first repository of a public cloud file store, wherein the public cloud file store is natively mounted on a network security device that is protecting the enterprise network and wherein the users do not have read access to the first repository of the public cloud file store; and
causes the network security device to make a determination regarding whether the untrusted file is a clean file that is free of malicious content by applying one or more security checks to the untrusted file; and
a clean file transfer module, which when executed by the one or more processors, makes the clean file accessible to the users by, when a result of the determination is affirmative, copying the clean file from the first repository to a second repository that is accessible to the users.

2. The secure data transfer system of claim 1, wherein the network security device is or comprises any or a combination of a sandbox device, a network controller, a firewall, a network gateway device, an Intrusion Prevention System (IPS), and an Intrusion Detection System (IDS).

3. The secure data transfer system of claim 1, wherein the network security device comprises a sandbox appliance, and wherein the one or more security checks comprise behavioral-based malware detection.

4. The secure data transfer system of claim 1, wherein the network security device comprises a virtual machine that is controlled by a sandbox appliance to determine whether the untrusted file is a clean file that is free of malicious content.

5. The secure data transfer system of claim 1, wherein the network security device copies the file to the second repository by sharing it by means of any or a combination of network file system (NFS), file transfer protocol (FTP), common Internet file system (CIFS), Internet Small Computer Systems Interface (iSCSI), Storage Area Network (SAN), and local storage.

6. The secure data transfer system of claim 1, wherein the untrusted file processing module further removes any malware from the untrusted file that is detected by the one or more security checks when the result of said determining is negative.

7. The secure data transfer system of claim 1, wherein the untrusted file processing module quarantines or deletes the untrusted file when the result of the determination is negative.

8. The secure data transfer system of claim 1, wherein the second repository is part of the network security device or part of an external storage device that forms part of the enterprise network.

9. The secure data transfer system of claim 1, wherein the second repository forms part of the public cloud file store.

10. The secure data transfer system of claim 1, wherein the public cloud file store is provided by a third-party cloud storage service provider.

11. The secure data transfer system of claim 1, wherein the network security device determines whether the untrusted file is a clean file that is free of malicious content based any or a combination of a file signature, a file hash, a file path, file attributes, a file source, file pre-scan parameters, a file extension, file content, and a file name, and any part thereof.

12. The secure data transfer system of claim 1, wherein the network security device makes said determination regarding whether the untrusted file is a clean file that is free of malicious content by first moving the untrusted file from the first repository to a third repository, and then applying one or more security checks to the untrusted file in the third repository, and moving back the checked file as a clean file into the first repository for onward copying to the second repository or moving the checked file as a clean file directly from the third repository to the second repository.

13. A method comprising:
receiving, by a network security device that is protecting an enterprise network, a notification, via an Application Programming Interface (API) call from a notification service monitoring a first repository of a public cloud file store, regarding existence of an untrusted file stored within the first repository, wherein the public cloud file store is natively mounted on the network security device and wherein users of the enterprise network do not have read access to the first repository of the public cloud file store;
determining, by the network security device, whether the untrusted file is a clean file that is free of malicious content by applying one or more security checks to the untrusted file; and
making the clean file accessible to the users by, when a result of said determining is affirmative, copying the clean file from the first repository to a second repository that is accessible to the users.

14. The method of claim 13, wherein the network security device is or comprises any or a combination of a sandbox device, a network controller, a firewall, a network gateway device, an Intrusion Prevention System (IPS), and an Intrusion Detection System (IDS).

15. The method of claim 13, wherein the network security device comprises a sandbox appliance, and wherein the one or more security checks comprise behavioral-based malware detection.

16. The method of claim 13, wherein the network security device copies the file to the second repository by sharing it by means of any or a combination of network file system (NFS), file transfer protocol (FTP), common Internet file system (CIFS), Internet Small Computer Systems Interface (iSCSI), Storage Area Network (SAN), and local storage.

17. The method of claim 13, further comprising removing, by the network security device, any malware from the untrusted file that is detected by the one or more security checks when the result of said determining is negative.

18. The method of claim 13, further comprising quarantining or deleting, by the network security device, the untrusted file when the result of said determining is negative.

19. The method of claim 13, wherein the second repository is part of the network security device or part of an external storage device that forms part of the enterprise network.

20. The method of claim 13, wherein the second repository forms part of the public cloud file store.

21. A non-transitory computer-readable storage medium embodying a set of instructions, which when executed by one or more processors of a network security device, cause the one or more processors to:

receive a notification via an Application Programming Interface (API) call from a notification service monitoring a first repository of a public cloud file store, regarding existence of an untrusted file stored within the first repository, wherein the public cloud file store is natively mounted on the network security device and wherein users of an enterprise network protected by the network security device do not have read access to the first repository of the public cloud file store;

determine whether the untrusted file is a clean file that is free of malicious content by applying one or more security checks to the untrusted file; and make the clean file accessible to the users by, when a result of said determining is affirmative, copying the clean file from the first repository to a second repository that is accessible to the users.

22. The non-transitory computer-readable storage medium of claim 21, wherein the network security device is or comprises any or a combination of a sandbox device, a network controller, a firewall, a network gateway device, an Intrusion Prevention System (IPS), and an Intrusion Detection System (IDS).

23. The non-transitory computer-readable storage medium of claim 21, wherein the network security device comprises a sandbox appliance, and wherein the one or more security checks comprise behavioral-based malware detection.

24. The non-transitory computer-readable storage medium of claim 21, wherein the network security device copies the file to the second repository by sharing it by means of any or a combination of network file system (NFS), file transfer protocol (FTP), common Internet file system (CIFS), Internet Small Computer Systems Interface (iSCSI), Storage Area Network (SAN), and local storage.

25. The non-transitory computer-readable storage medium of claim 21, wherein the instructions further cause the one or more processors to remove any malware from the untrusted file that is detected by the one or more security checks when the result of said determining is negative.

26. The non-transitory computer-readable storage medium of claim 21, wherein the instructions further cause the one or more processors to quarantine or delete the untrusted file when the result of said determining is negative.

27. The non-transitory computer-readable storage medium of claim 21, wherein the second repository is part of the network security device or part of an external storage device that forms part of the enterprise network.

28. The non-transitory computer-readable storage medium of claim 21, wherein the second repository forms part of the public cloud file store.

* * * * *

(12) INTER PARTES REVIEW CERTIFICATE (3870th)

United States Patent
Graun et al.

(10) Number: US 11,036,856 K1
(45) Certificate Issued: Feb. 7, 2025

(54) NATIVELY MOUNTING STORAGE FOR INSPECTION AND SANDBOXING IN THE CLOUD

(71) Applicants: Jason Graun; Jesse Alverson

(72) Inventors: Jason Graun; Jesse Alverson

(73) Assignee: FORTINET, INC.

Trial Number:

IPR2023-00456 filed Jan. 31, 2023

Inter Partes Review Certificate for:

Patent No.: 11,036,856
Issued: Jun. 15, 2021
Appl. No.: 16/132,433
Filed: Sep. 16, 2018

The results of IPR2023-00456 are reflected in this inter partes review certificate under 35 U.S.C. 318(b).

INTER PARTES REVIEW CERTIFICATE
U.S. Patent 11,036,856 K1
Trial No. IPR2023-00456
Certificate Issued Feb. 7, 2025

AS A RESULT OF THE INTER PARTES REVIEW PROCEEDING, IT HAS BEEN DETERMINED THAT:

Claims 1-28 are cancelled.

\* \* \* \* \*